United States Patent
Jiang

(10) Patent No.: US 11,206,660 B2
(45) Date of Patent: Dec. 21, 2021

(54) METHOD FOR TRANSMITTING INFORMATION, TERMINAL AND NETWORK DEVICE

(71) Applicant: VIVO MOBILE COMMUNICATION CO.,LTD., Guangdong (CN)

(72) Inventor: Lei Jiang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 1 day.

(21) Appl. No.: 16/606,386

(22) PCT Filed: Apr. 18, 2018

(86) PCT No.: PCT/CN2018/083548
§ 371 (c)(1),
(2) Date: Oct. 18, 2019

(87) PCT Pub. No.: WO2018/192522
PCT Pub. Date: Oct. 25, 2018

(65) Prior Publication Data
US 2020/0163066 A1 May 21, 2020

(30) Foreign Application Priority Data
Apr. 21, 2017 (CN) .......................... 201710267335.3

(51) Int. Cl.
*H04L 29/06* (2006.01)
*H04L 9/32* (2006.01)
(Continued)

(52) U.S. Cl.
CPC ....... *H04W 72/044* (2013.01); *H04W 72/042* (2013.01); *H04W 72/048* (2013.01)

(58) Field of Classification Search
CPC ............ H04L 1/1861; H04W 72/0453; H04W 72/042; H04W 72/1284; H04W 72/1289; H04J 11/0066
(Continued)

(56) References Cited

U.S. PATENT DOCUMENTS 6,524,189 B1 * 2/2003 Rautila ................... A63F 13/12
463/40
2004/0100929 A1 * 5/2004 Garcia-Luna-Aceves ...................
H04W 72/1278
370/338
(Continued)

FOREIGN PATENT DOCUMENTS

| CN | 102349346 A | 2/2012 |
|----|-------------|--------|
| CN | 102450072 A | 5/2012 |
| WO | 2018023906 A1 | 2/2018 |

OTHER PUBLICATIONS

3GPP TSG RAN WG1 NB-IoT ad-hoc Budapest, Hungary, Jan. 18-20, 2016 (Year: 2016).*
(Continued)

*Primary Examiner* — Syed Ali
*Assistant Examiner* — Jason A Harley
(74) *Attorney, Agent, or Firm* — Maschoff Brennan

(57) ABSTRACT

The present disclosure discloses a method for transmitting information, a terminal and a network device. The method includes: obtaining anchor transmission bandwidth information configured by a network device for a terminal, where a transmission bandwidth corresponding to the anchor transmission bandwidth information is at least one of transmission bandwidths supported by the terminal; and transmitting information via transmission resources corresponding to the anchor transmission bandwidth information.

17 Claims, 5 Drawing Sheets

Obtaining anchor transmission bandwidth information, which is configured by the network device for a terminal —11

Transmitting information via transmission resources corresponding to the anchor transmission bandwidth information —12

(51) Int. Cl.
    *H04W 72/04*     (2009.01)
    *H04W 88/00*     (2009.01)

(58) Field of Classification Search
    USPC .......................................... 370/329; 455/464
    See application file for complete search history.

(56) References Cited

U.S. PATENT DOCUMENTS

| | | | | |
|---|---|---|---|---|
| 2008/0259857 | A1* | 10/2008 | Zheng | H04B 7/155 370/329 |
| 2008/0316954 | A1* | 12/2008 | Zheng | H04W 28/20 370/315 |
| 2010/0195507 | A1* | 8/2010 | Marinier | H04W 76/19 370/242 |
| 2010/0232373 | A1 | 9/2010 | Nory et al. | |
| 2011/0177807 | A1* | 7/2011 | Cho | H04W 56/00 455/422.1 |
| 2012/0044910 | A1* | 2/2012 | Maeda | H04L 5/0005 370/332 |
| 2012/0077445 | A1 | 3/2012 | Konno et al. | |
| 2017/0094621 | A1 | 3/2017 | Xu et al. | |
| 2018/0146439 | A1* | 5/2018 | Kim | H04W 52/322 |
| 2018/0206143 | A1* | 7/2018 | Patil | H04W 76/14 |

OTHER PUBLICATIONS

R1-1609562 "Consideration on narrowband anchor based access" MediaTek Inc., 3GPP TSGRAN WG1 Meeting #86is, Oct. 10, 2016.

R1-160466, "Details on NB-MIB design for NB-IoT" 3GP TSG RAN WG1 Meeting #84, Feb. 15, 2016.

R1-1701644, "Bandwidth adaptation and scalable design in NR" 3GPP TSG TAN WG1 Meeting #88, Feb. 13, 2017.

R1-1701656, "On the maximum carrier bandwidth and multiple carriers operation" 3GPP TSG RAN WG1 Meeting #88, Feb. 13, 2017.

R1-1704438, "Discussion on remaining system information delivery" 3GPP TSG RAN WG1 Meeting #88, Apr. 3, 2017.

R1-1704445, "Efficient Wider Bandwidth Operations for NR" 3GPP TSG RAN WG1 Meeting #88, Apr. 13, 2017.

R2-168527, "Concatenation in NR", 3GPP TSG-RAN WG2 Meeting #96, Nov. 12, 2016.

ISR and Written Opinion in Application No. PCT/CN2018/083548 dated Apr. 18, 2018.

CN Office Action in Application No. 201710267335.3 dated Jun. 13, 2019.

European Search Report in Application No. 18787275.9 \dated Mar. 10, 2020.

VIVO "Discussion on NR resource allocation" 3GPP TSG RAM WF1 Meeting #88bis R1-1704501, Spokane, USA, 3rd; Apr. 7, 2017.

Alcatel-Lucent et al. "Consideration of Multi-Band NB-IOT" 3GPP TSG RAN WG 1 NB-IOT ad-hoc R1-160180, Budapest, Hungary; Jan. 18-20, 2016.

EP Search Report in Application No. 18 787 275.9 dated Sep. 1, 2021.

* cited by examiner

METHOD FOR TRANSMITTING INFORMATION, TERMINAL AND NETWORK DEVICE

CROSS-REFERENCE TO RELATED APPLICATION

This application is the U.S. national phase of PCT Application PCT/CN2018/083548 filed on Apr. 18, 2016, which claims the benefit and priority of Chinese Application No. 201710267335.3, filed on Apr. 21, 2017. The entire disclosures of the application are incorporated herein by reference.

TECHNICAL FIELD

The present disclosure relates to a field of communication technology, and more particularly a method for transmitting information, a terminal and a network device.

BACKGROUND

Compared with the conventional mobile communication system, the future mobile communication system, such as a New Radio (NR) system needs to adapt to more diversified scenarios and service requirements. Main scenarios of the NR mainly include enhanced Mobile Broadband (eMBB), massive Machine Type Communications (mMTC) and Ultra Reliable and Low Latency Communication (uRLLC). These scenarios put forward various requirements, such as high reliability, low latency, large bandwidth and broad coverage, etc. In order to satisfy services and application scenarios of different requirements, a sub-carrier spacing of the NR system is not similar to that of the Long Term Evolution (LTE) system, which adopts a single sub-carrier spacing, i.e., 15 kHz. The NR system may support multiple sub-carrier spacings and different sub-carrier spacings may adapt to different scenarios. For instance, a relative large sub-carrier spacing may be configured for a large bandwidth of high frequency band. In addition, the large sub-carrier spacing may correspond to small symbol length in the time domain, which may fulfill requirements of low latency services.

In the NR technical scheme, the sub-carrier spacing of the system may be $2^n*15$ kHz. The same carrier may have different sub-carrier spacings. That is, different carrier numerologies may be reused. Different services or different scenarios use corresponding numerology. When the service changes, the NR system changes the numerology according to requirements, so as to make the numerology fulfill the requirements. In addition, since the Uplink (UL) service and Downlink (DL) service may be different, the numerologies of UL links and DL links may be different.

In the Long Term Evolution (LTE) system, the system transmission adopts a fixed sub-carrier spacing of 15 kHz and both the UL and DL data transmission adopts the fixed timeslot length. While in the NR system, the UE may support more than one bandwidth part/frequency range/sub-band, which is called the transmission bandwidth for short in the following sections. Different service data is transmitted on resources corresponding to these different transmission bandwidths. However, different types of service data are not available at all times. Therefore, if the UE simultaneously turns on multiple Radio Frequency (RF) chains, extra power loss will occur.

SUMMARY

Embodiments of the present disclosure provide a method for transmitting information, a terminal and a network device, to solve a problem that the UE in the communication system supports multiple transmission bandwidths and extra power loss occurs due to that the UE simultaneously turns on multiple RF chains.

According to a first aspect, embodiments of the present disclosure provide a method for transmitting information, applied to a terminal, including:

obtaining anchor transmission bandwidth information configured by a network device for the terminal, wherein a transmission bandwidth corresponding to the anchor transmission bandwidth information is at least one of transmission bandwidths supported by the terminal; and transmitting information via transmission resources corresponding to the anchor transmission bandwidth information.

According to a second aspect, embodiments of the present disclosure provide a method for transmitting information, applied to a network device, including:

configuring and transmitting corresponding anchor transmission bandwidth information for a terminal, wherein a transmission bandwidth corresponding to the anchor transmission bandwidth information is at least one of transmission bandwidths supported by the terminal; and transmitting information via transmission resources corresponding to the anchor transmission bandwidth information.

According to a third aspect, embodiments of the present disclosure provide a terminal, including:

an obtaining module, configured to obtain anchor transmission bandwidth information configured by a network device for the terminal, wherein a transmission bandwidth corresponding to the anchor transmission bandwidth information is at least one of transmission bandwidths supported by the terminal; and a first transmitting module, configured to transmit information via transmission resources corresponding to the anchor transmission bandwidth information.

According to a fourth aspect, embodiments of the present disclosure provide a network device, including:

a processing module, configured to configure and transmit corresponding anchor transmission bandwidth information for a terminal, wherein a transmission bandwidth corresponding to the anchor transmission bandwidth information is at least one of transmission bandwidths supported by the terminal; and a second transmitting module, configured to transmit information via transmission resources corresponding to the anchor transmission bandwidth information.

According to a fifth aspect, embodiments of the present disclosure provide a terminal, including: a processor, a storage and computer programs which are stored in the storage and run on the processor, wherein the computer programs are executed by the processor to implement steps in the method for transmitting the information in the first aspect.

According to a sixth aspect, embodiments of the present disclosure provide a network device, including: a processor, a storage and computer programs which are stored in the storage and run on the processor, wherein the computer programs are executed by the processor to implement steps in the method for transmitting the information in the second aspect.

According to a seventh aspect, embodiments of the present disclosure provide a computer readable storage medium, wherein the computer readable storage medium stores computer programs which are executed by the processor to implement steps in the method for transmitting the information in the first aspect.

According to an eighth aspect, embodiments of the present disclosure provide a computer readable storage medium, wherein the computer readable storage medium stores computer programs which are executed by the processor to implement steps in the method for transmitting the information in the second aspect.

Therefore, in embodiments of the present disclosure, at least one anchor transmission bandwidth is set for the terminal, so that the terminal transmits information via the transmission resources corresponding to the anchor transmission bandwidth information when the terminal does not receive the dedicated transmission bandwidth information indicated by the network device. This is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

Exemplary embodiments of the present disclosure are described in detail hereinafter with reference to accompanying drawings. Although the accompanying drawings show the exemplary embodiments of the present disclosure, it should be understood that the present disclosure may be implemented via various methods without being limited by the described embodiments. On the contrary, these embodiments contribute to a more thorough understanding of the present disclosure and completely convey the scope of the present disclosure to those skilled in the art of the present disclosure.

Figure 1:
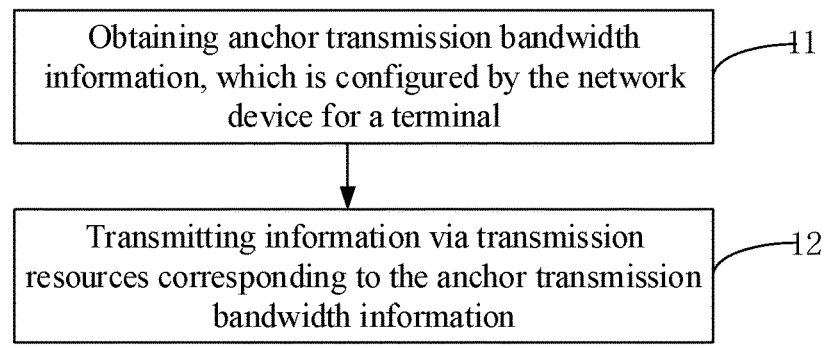
FIG. 1 is a flow chart illustrating a method for transmitting information at a terminal according to an embodiment of the present disclosure.

Embodiments of the present disclosure provide a method for transmitting information, which is applied to the terminal. As shown in FIG. 1, the method specifically includes following steps.

At step 11, anchor transmission bandwidth information, which is configured by the network device for a terminal, is obtained.

In the communication system, such as the NR system have multiple transmission bandwidths and corresponding terminals also support multiple transmission bandwidths. The transmission bandwidth corresponding to the anchor transmission bandwidth information is at least one of transmission bandwidths supported by the terminal. Further, the transmission bandwidth is also called the bandwidth part, frequency range or sub-band. In other words, the UE may support more than one bandwidth part/frequency range/sub-band, while the service data is not available at all times. Therefore, if the terminal simultaneously turns on multiple Radio Frequency (RF) chains, extra power loss occurs. In order to solve this problem, a network device, such as a base station, e.g., gNB may configure the anchor transmission bandwidth, i.e., the anchor bandwidth part/frequency scope/sub-band, which is called the anchor transmission bandwidth hereinafter for short, for the terminal. The network device transmits the configured anchor transmission bandwidth in the anchor transmission bandwidth information to the terminal. The anchor transmission bandwidth information is used to indicate the anchor transmission bandwidth. Therefore, the terminal only needs to turn on the RF chain corresponding to the anchor transmission bandwidth in the long run, which reduces unnecessary power loss. Embodiments of the present disclosure take the NR system for example and it can be understood that this technical scheme is applicable to the system having the same technical problem. The protection scope of the invention shall be subject to claims and shall not be limited by embodiments or specific terms in embodiments.

At step 12, information is transmitted via transmission resources corresponding to the anchor transmission bandwidth information.

The information transmission mentioned here may be Uplink (UL) transmission or Downlink (DL) transmission. When the network device does not indicate dedicated transmission resources for the terminal, the terminal may transmit or receive the information via the transmission resources corresponding to the anchor transmission bandwidth information.

The step 11 may be implemented via following modes: receiving the anchor transmission bandwidth information, which is configured by the network device for the terminal, via system information, broadcast information, high layer signaling, group common PDCCH or physical layer signaling. The anchor transmission bandwidth may be statically, semi-statically, or dynamically configured. Specifically, when the anchor transmission bandwidth is statically configured, the anchor transmission bandwidth may be defined in protocol or may be obtained via System Information (SI), NR-Primary Synchronization Signal (PSS), NR-Secondary Synchronization Signal (SSS), or broadcast information, etc. When the anchor transmission bandwidth is semi-statically configured, the anchor transmission bandwidth may be obtained via the high layer signaling (such as Radio Resource Control (RRC) signaling), group common Physical Downlink Control Channel (PDCCH), etc. For flexibility, when the anchor transmission bandwidth is dynamically configured, the anchor transmission bandwidth may be obtained via Media Access Control (MAC) Control Element (CE) or physical layer signaling. The physical layer signaling may be signaling in Downlink Control Information (DCI) or group common PDCCH.

The anchor transmission bandwidth information is used to indicate the anchor transmission bandwidth configured by the network device for the terminal. Specifically, the anchor transmission bandwidth information includes: at least one of frequency domain location information, bandwidth information, numerology information and antenna port configuration information of the transmission resources. The numerology is also called the parameter configuration. Sub-carrier spacings, frequency domain resource bandwidths or Cyclic Prefixes (CP) corresponding to different numerologies may be different. Different numerologies may be reused. The numerology information includes at least one of the frequency domain resource bandwidth, sub-carrier spacing and CP.

Further, since the anchor transmission bandwidth information may be fixed, that is, each anchor transmission bandwidth corresponds to a group of fixed frequency domain location information, bandwidth information, numerology and/or antenna port configuration information. In order to reduce the network overhead of the anchor transmission bandwidth information, the anchor transmission bandwidth information may be defined in protocol and each group of anchor transmission bandwidth information corresponds to a fixed and unique index. Therefore, the step for the terminal to obtain the anchor transmission bandwidth information configured by the network device for the terminal may be implemented via following modes: receiving index information, which is configured by the network device for the terminal and transmitted from the network device; and determining anchor transmission bandwidth information corresponding to the index information according to a predefined mapping relationship between the anchor transmission bandwidth information and the index information. That is, the network device notifies the terminal of the index and then the terminal finds the corresponding anchor transmission bandwidth information according to the index.

Further, the anchor transmission bandwidth information may change semi-statically or dynamically. As for the anchor transmission bandwidth information, which changes semi-statically, the network device may notify the terminal of the corresponding relationships between all anchor transmission bandwidth information and indexes. When the anchor transmission bandwidth information of the terminal changes, the network device notifies the terminal of an index corresponding to new anchor transmission bandwidth information, so that the terminal finds the corresponding anchor transmission bandwidth information according to the pre-stored corresponding relationship between all the anchor transmission bandwidth information and the indexes. It's worth pointing out that the above mode, in which the indication is made by index only, is applicable to an application scenario, in which the change period of the anchor transmission bandwidth information supported by the network device is longer than a period of configuring the anchor transmission bandwidth information for the terminal. When the change period of the anchor transmission bandwidth information supported by the network device equals or is shorter than the period of configuring the anchor transmission bandwidth information for the terminal, the above mode, in which the indication is made by index only, is no longer applicable.

The mode for the terminal to obtain the anchor transmission bandwidth information is described hereinafter in the scenario that the change period of the anchor transmission bandwidth information supported by the network device equals or is shorter than the period of configuring the anchor transmission bandwidth information for the terminal. That is, when the change period of the anchor transmission bandwidth information supported by the network device equals or is shorter than the period of configuring the anchor transmission bandwidth information for the terminal, or called when the anchor transmission bandwidth information dynamically changes, the network device needs to transmits the updated anchor transmission bandwidth information to the terminal when the anchor transmission bandwidth information of the terminal changes and the terminal directly receives the updated anchor transmission bandwidth information transmitted from the network device.

Further, the anchor transmission bandwidth information specifically includes: DL anchor transmission bandwidth information and/or UL anchor transmission bandwidth information. Transmission of different scenarios is described hereinafter according to different types of anchor transmission bandwidth information.

When the anchor transmission bandwidth information is the DL anchor transmission bandwidth information, the step 12 specifically includes: receiving, by the UE, the DL information transmitted from the network device via DL transmission resources corresponding to the DL anchor transmission bandwidth information. It is worth pointing out that the applicable scenario is that when the network device does not indicate dedicated DL transmission bandwidth for next transmission or the dedicated DL transmission bandwidth indicated by the network side for the next transmission is the DL anchor transmission bandwidth, the terminal receives UL scheduling information, i.e., UL grant sent from the network device according to DL transmission resources corresponding to the DL anchor transmission bandwidth. There is no need to turn on all supported RF chains, so as to reduce the power consumption of the terminal.

Figure 2:
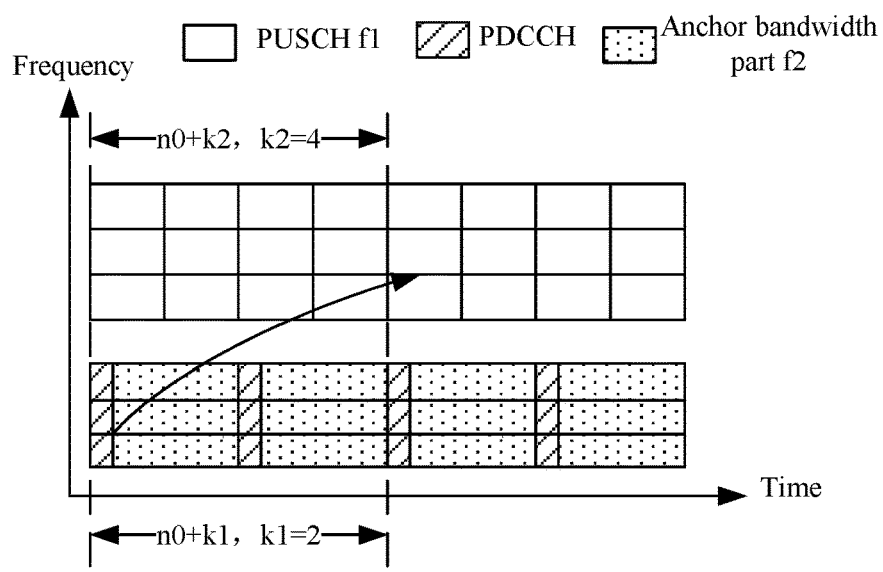
FIG. 2 is a first schematic diagram illustrating resources of DL anchor transmission bandwidth according to an embodiment of the present disclosure.
Figure 3:
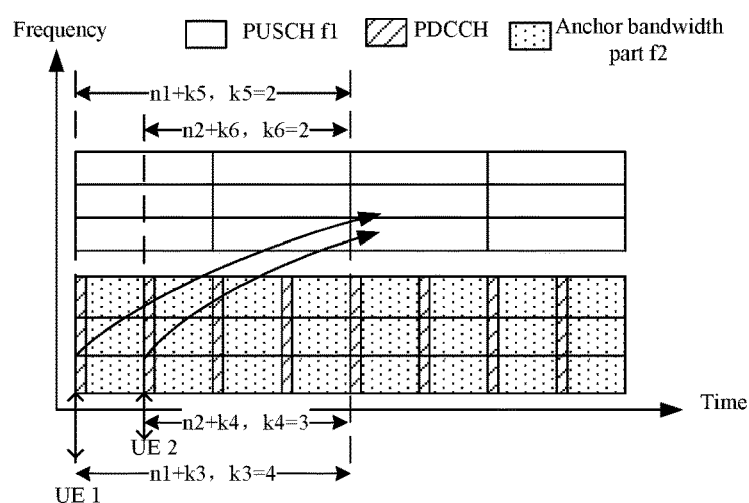
FIG. 3 is a second schematic diagram illustrating resources of DL anchor transmission bandwidth according to an embodiment of the present disclosure.

Specifically, the step for receiving the DL information transmitted from the network device via the DL transmission resources corresponding to the DL anchor transmission bandwidth information includes: receiving the UL scheduling information transmitted from the network device via the transmission resources, which are in the transmission resources corresponding to the anchor transmission bandwidth information and are used for transmitting Physical Downlink Control Channel (PDCCH). The UL scheduling information at least indicates first transmission resources scheduled by the network device for the terminal. The first transmission resources include UL transmission resources with an interval of k first transmission time units from the transmission resources corresponding to the PDCCH. The UE transmits data to the network device via the first transmission resources. The first transmission time unit is a transmission time unit corresponding to the UL transmission resources or a transmission time unit corresponding to the DL anchor transmission bandwidth information, k is a positive integer. For instance, it is supposed that Ultra Reliable and Low Latency Communication (URLLC) services of the UE are transmitted on resources with a sub-carrier spacing of f1 and the DL anchor transmission bandwidth information configured by the network device for the terminal corresponds to resources with a sub-carrier spacing of f2, when the UE only has UL URLLC services, the network device may schedule the URLLC services via the transmission resources corresponding to the DL anchor transmission bandwidth information of the UE. As shown in FIG. 2, the UE receives the UL scheduling information via the PDCCH and it is supposed that transmission resources used by the UE for receiving the UL scheduling information are n0. In FIG. 2, the sub-carrier spacing f1 corresponding to Physical Uplink Shared Channel (PUSCH), is 30 kHz, and the sub-carrier spacing f2 corresponding to the anchor transmission bandwidth is 15 kHz. Accordingly, the transmission time unit corresponding to the PUSCH is half of that corresponding to the anchor transmission bandwidth. When the first transmission time unit is based on the larger transmission time unit of the anchor transmission bandwidth, the UL transmission resources scheduled for the UE are n0+k1, k1=2. When the first transmission time unit is based on the smaller transmission time unit of the PUSCH, the transmission resources scheduled for the UE are n0+k2, k2=4. Again, as shown in FIG. 3, the sub-carrier f1 corresponding to PUSCH is 15 kHz, and the sub-carrier f2 corresponding to the anchor transmission bandwidth is 30 kHz. Accordingly, the transmission time unit corresponding to the PUSCH is two times of that corresponding to the anchor transmission bandwidth. The UL scheduling information of UE1 is transmitted on PDCCH1 and transmission resources corresponding to the PDCCH1 are n1. The UL scheduling information of the UE2 is transmitted on PDCCH2 and the transmission resources corresponding to the PDCCH2 are n2. When the first transmission time unit is based on the smaller transmission time unit of the anchor transmission bandwidth, the UL transmission resources scheduled for the UE1 are n1+k3 and the UL transmission resources scheduled for the UE2 are n2+k4, where k3=4, k4=3. When the first transmission time unit is based on the larger transmission time unit of the PUSCH, the transmission resources scheduled for the UE1 are n1+k5 and the transmission resources scheduled for the UE2 are n1+k6, k5=k6=2.

When the anchor transmission bandwidth information is the UL anchor transmission bandwidth information, the step 12 specifically includes: transmitting the UL information to the network device via the UL transmission resources corresponding to the UL anchor transmission bandwidth. It is worth pointing out that the applicable scenario includes: when the network device does not configure dedicated UL transmission bandwidth for the terminal or the dedicated UL transmission bandwidth configured by the network device for the terminal is the UL anchor transmission bandwidth, the terminal transmits the UL information to the network device via UL transmission resources corresponding to the obtained UL anchor transmission bandwidth and needs not to turn on all supported RF chains, so as to reduce the terminal power consumption.

Further, Acknowledgement/Non-Acknowledgement (ACK/NACK) information is a scenario of the UL transmission, which is further described in detail in this embodiment. That is, the step for transmitting the UL information to the network device via the UL transmission resources corresponding to the UL anchor transmission bandwidth information includes: transmitting the ACK/NACK information, which is used to indicate the reception situation of the DL information, to the network device using the transmission resources corresponding to the anchor transmission bandwidth information. It is supposed that the ACK/NACK information is transmitted with the delay of m transmission time units after the data is received, the steps of transmitting the ACK/NACK information, which is used to indicate the reception situation of the DL information, to the network device using the transmission resources corresponding to the anchor transmission bandwidth information includes: determining the transmission resources with an interval of m second transmission time units from the transmission resources, which are in the transmission resources corresponding to the anchor transmission bandwidth information and used to transmit the PDSCH, as the second transmission resources; and transmitting the ACK/NACK information, which is used to indicate the reception situation of the DL information, to the network device via the second transmission resources. The second transmission time unit is a transmission time unit corresponding to the PDSCH or a transmission time unit corresponding to the anchor transmission bandwidth information, m is a positive integer.

Figure 4:
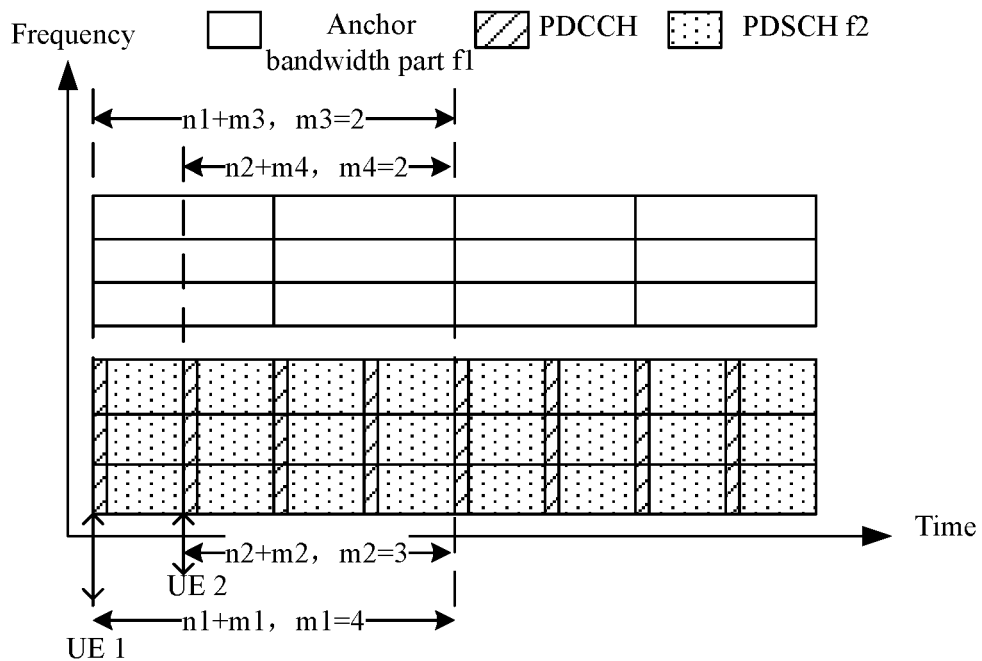
FIG. 4 is a first schematic diagram illustrating resources of UL anchor transmission bandwidth according to an embodiment of the present disclosure.

Further, the network device determines the value of k or m according to various factors, such as the numerology used by the terminal for transmitting the data, the numerology of the UL anchor transmission bandwidth and processing time of the terminal. As for the Frequency Division Duplexing (FDD) system or (paired spectrum), when the ACK/NACK is transmitted on the UL anchor transmission bandwidth, the numerology of the anchor transmission bandwidth may be fixed or semi-statically configured. Therefore, the time interval m between transmission of PDSCH and ACK/NACK may be fixed or semi-statically configured. Then, m may be defined in the protocol or notified via the SI, broadcast channel, high layer signaling, group common PDCCH, etc. Since m is based on the transmission time units (timeslots) corresponding to the numerologies of different transmission bandwidths and the sub-carrier spacings and transmission time units corresponding to the numerologies of different transmission bandwidths are different, feedback delay m of different terminals may be the same or may be different. Such as, as shown in FIG. 4, both UE1 and UE2 receive data via the same PDSCH, however, resource locations corresponding to the UE1 and UE2 are different (it is supposed that the resource location corresponding to the UE1 is n1 and the resource location corresponding to the UE2 is n2). Suppose the sub-carrier spacing f1 corresponding to the numerology of PDSCH is larger than the sub-carrier spacing f2 corresponding to the numerology of the UL anchor transmission bandwidth (where, in the figure, f1=30 kHz, f2=15 kHz), the transmission time unit corresponding to the PDSCH is half of the transmission time unit corresponding to the UL anchor transmission bandwidth. When the transmission time unit of the PDSCH with smaller transmission time unit is taken as baseline, the transmission resource location corresponding to the ACK/NACK information of the UE1 is n1+m1 and the transmission resource location corresponding to the ACK/NACK information of the UE2 is n2+m2, the value of m1 is different from that of m2, m1=4, m2=3. When the transmission time of the UL anchor transmission bandwidth with larger transmission time unit is taken as baseline, the transmission resource location corresponding to the ACK/NACK information of the UE1 is n1+m3 and the transmission resource location corresponding to the ACK/NACK information of the UE2 is n2+m4, the value of m3 is the same as that of the m4, 3=m4=2.

Figure 5:
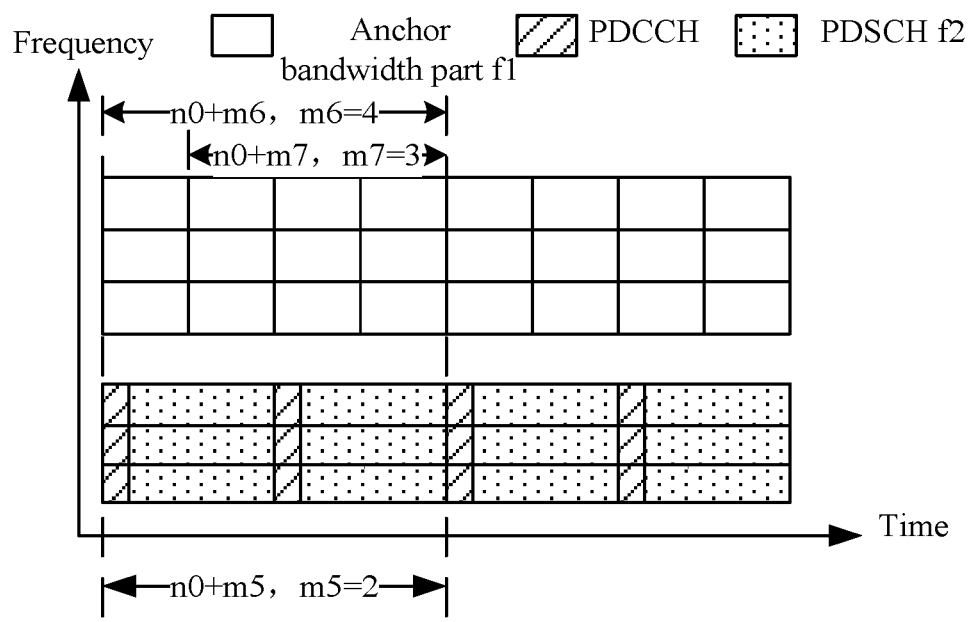
FIG. 5 is a second schematic diagram illustrating resources of UL anchor transmission bandwidth according to an embodiment of the present disclosure.

For another instance, as shown in FIG. 5, suppose that the sub-carrier spacing f1 corresponding to the numerology of the PDSCH of the transmission data is shorter than the sub-carrier spacing f2 corresponding to the numerology of the UL anchor transmission bandwidth (in the figure, f1=15 kHz, f2=30 kHz), the transmission time unit corresponding to the PDSCH is two times of that corresponding to the UL anchor transmission bandwidth. When the transmission time unit of the PDSCH with larger transmission time unit is taken as baseline, the transmission resource location corresponding to the ACK/NACK information of the UE is n0+m5, m5=2. When the transmission time unit of the anchor transmission bandwidth with smaller transmission time unit is taken as baseline, the transmission resource location corresponding to the ACK/NACK information of the UE is n0+m6 (taking the transmission starting resource as a starting point), or n0+m7 (taking the transmission ending resource as the starting point). The value of m6 is different from m7, m6=4, m7=3.

In the method for transmitting information in embodiments of the present disclosure, the network device configures at least one anchor transmission bandwidth for the terminal, so that the terminal transmits the information via the transmission resources corresponding to the anchor transmission bandwidth information when the terminal does not receive the dedicated transmission bandwidth information indicated by the network device or when the received dedicated transmission bandwidth indicated by the network device is the anchor transmission bandwidth. Therefore, this technical scheme is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

The above embodiments respectively describe the methods for transmitting information in different scenarios. Terminals corresponding to the above methods are further described in this embodiment accompanying with FIGS. 6 and 7.

Figure 6:
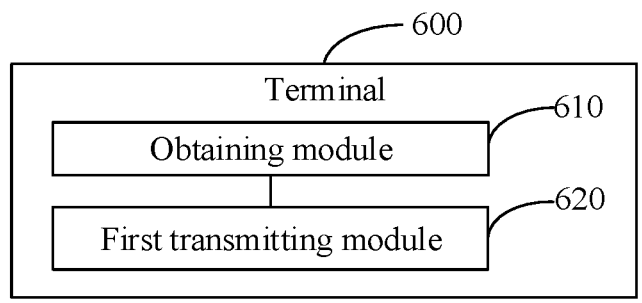
FIG. 6 is a first schematic diagram illustrating modules of a terminal according to an embodiment of the present disclosure.

As shown in FIG. 6, the terminal 600 in embodiments of the present disclosure may implement the details of the method in the above embodiments, such as obtaining the anchor transmission bandwidth information configured by the network device for the terminal, in which the transmission bandwidth corresponding to the anchor transmission bandwidth information is at least one of transmission bandwidths supported by the terminal, and transmitting the information via the transmission resources corresponding to the anchor transmission bandwidth information, and may achieve the same effects. The terminal 600 specifically includes following function modules.

An obtaining module 610 is configured to obtain anchor transmission bandwidth information configured by a network device for the terminal. A transmission bandwidth corresponding to the anchor transmission bandwidth information is at least one of transmission bandwidths supported by the terminal.

A first transmitting module 620 is configured to transmit information via transmission resources corresponding to the anchor transmission bandwidth information.

Figure 7:
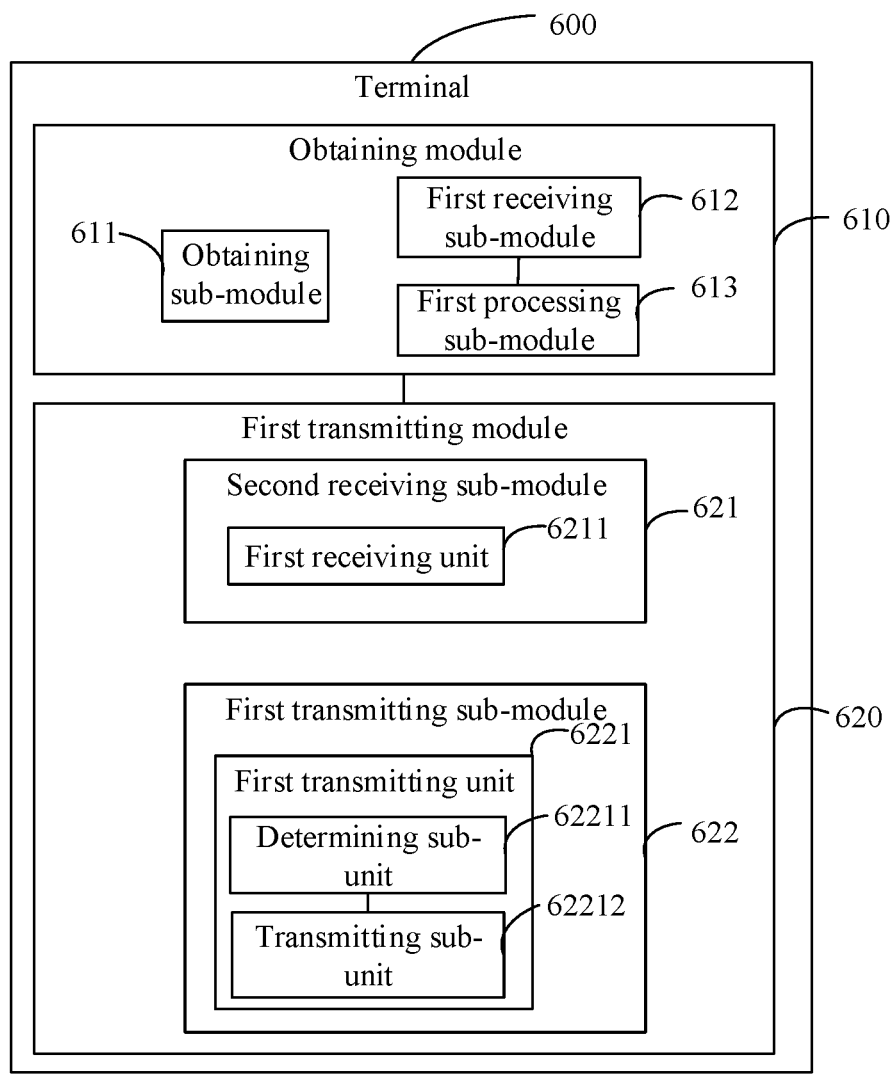
FIG. 7 is a second schematic diagram illustrating modules of a terminal according to an embodiment of the present disclosure.

As shown in FIG. 7, the obtaining module 610 includes: an obtaining sub-module 611, configured to receive the anchor transmission bandwidth information configured by the network device for the terminal via System Information (SI), broadcast information, high layer signaling, group common PDCCH or physical layer signaling.

The obtaining module 610 further includes:
a first receiving sub-module 612, configured to receive index information, which is configured by the network device for the terminal and transmitted from the network device; and
a first processing sub-module 613, configured to determine the anchor transmission bandwidth information corresponding to the index information according to a predefined mapping relationship between the anchor transmission bandwidth information and the index information.

The anchor transmission bandwidth information includes: Downlink (DL) anchor transmission bandwidth information and/or Uplink (UL) anchor transmission bandwidth information.

The first transmitting module 620 includes: a second receiving sub-module 621, configured to receive DL information transmitted from the network device via DL transmission resources corresponding to the DL anchor transmission bandwidth information when the anchor transmission bandwidth information is the DL anchor transmission bandwidth information.

The second receiving sub-module 621 includes:
a first receiving unit 6211, configured to receive UL scheduling information transmitted from the network device via transmission resources corresponding to the anchor transmission bandwidth information and the PDCCH;
the UL scheduling information at least indicates that the UL transmission resources with an interval of k first transmission time units from the PDCCH are first transmission resources, the first transmission time unit is a transmission time unit corresponding to the UL transmission resources or a transmission time unit corresponding to the anchor transmission bandwidth information, k is a positive integer.

The first transmission module 620 further includes: a first transmitting sub-module 622, configured to transmit UL information to the network device via UL transmission resources corresponding to the UL anchor transmission bandwidth information when the anchor transmission bandwidth information is the UL anchor transmission bandwidth information.

The first transmitting sub-module 622 includes: a first transmitting unit 6221, configured to transmit Acknowledgement/Non-Acknowledgement (ACK/NACK) information, which indicates a reception situation of DL information, to the network device via the transmission resources corresponding to the anchor transmission bandwidth information when the information transmission is feedback information transmission.

The first transmitting unit 6221 includes:
a first determining sub-unit 62211, configured to determine transmission resources with an interval of m second transmission time units from transmission resources, which are in the transmission resources corresponding to the anchor transmission bandwidth information and used to transmit the Physical Downlink Shared Channel (PDSCH), as second transmission resources. The second transmission time unit is a transmission time unit corresponding to the PDSCH or a transmission time unit corresponding to the anchor transmission bandwidth information, m is a positive integer; and
a first transmitting sub-unit 62212, configured to transmit the ACK/NACK information, which indicates the reception situation of the DL information, to the network device via the second transmission resources.

The anchor transmission bandwidth information includes: at least one of frequency domain location information, bandwidth information, numerology information and antenna port configuration information of the transmission resources.

It is worth pointing out that the terminal in embodiments of the present disclosure obtains the anchor transmission bandwidth information configured by the network device and transmits the information via the transmission resources corresponding to the anchor transmission bandwidth information when the terminal does not receive the dedicated transmission bandwidth information indicated by the network device. This is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

Figure 8:
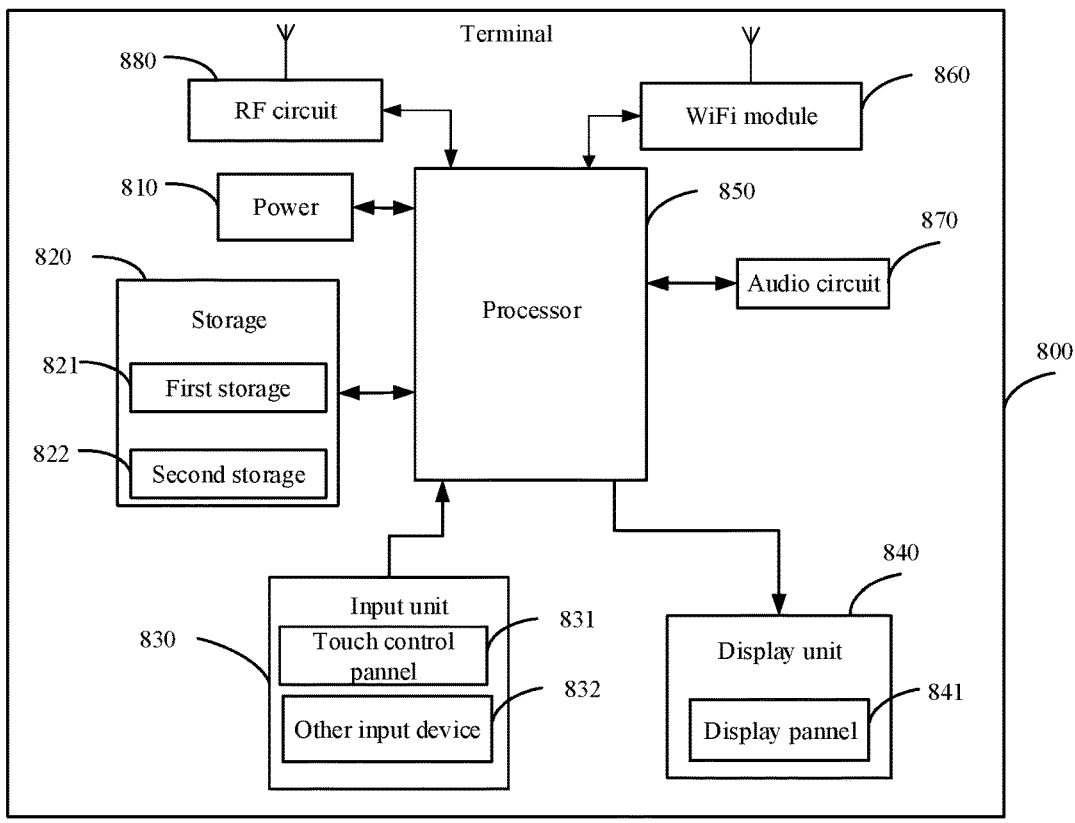
FIG. 8 is a schematic diagram illustrating structure of a terminal according to an embodiment of the present disclosure.

In order to better achieve the above objective, FIG. 8 is a schematic diagram illustrating structure of a terminal according to another embodiment of the present disclosure. Specifically, the terminal 800 in FIG. 8 may be a cell phone, a tablet PC, a Personal Digital Assistant (PDA) or an on-board computer, etc.

The terminal 800 in FIG. 8 includes: a power 810, a storage 820, an input unit 830, a display unit 840, a processor 850, a Wireless Fidelity (WIFI) module 860, an audio circuit 870 and a Radio Frequency (RF) circuit 880.

The input unit 830 can be used to receive information input by a user and generate signal input, which is related to user setting and function control of the terminal 800. Specifically, in embodiments of the present disclosure, the input unit 830 can include a touch control panel 831. The touch control panel 831, also known as the touch screen, can collect touch operations performed by the user on it or near it (such as operations performed by the user on the touch control panel 831 using any suitable object or attachment, such as a finger, a touch pen, etc.) and drive a corresponding connection device according to preset programs. Optionally, the touch control panel 831 can include two parts, i.e. a touch detection device and a touch controller. The touch detection device detects a touch location of the user, detects a signal generated by the touch operation and transmits the signal to the touch controller. The touch controller receives touch information from the touch detection device, converts the touch information into a touch point coordinate, sends the touch point coordinate to the processor 850, receives commands from the processor 850 and executes the commands. Further, the touch control panel 831 can be implemented via multiple types, such as a resistance, a capacitive, infrared ray and surface acoustic wave. Besides the touch control panel 831, the input unit 830 can also include other input devices 832. Other input devices 832 can include but not be limited to one or multiple of a physical keyboard, function keys (such as a volume control key, a switch, etc.) a trackball, a mouse and an operating lever, etc.

The display unit 840 may be used to display information input by the user or information provided to the user and various kinds of menu interfaces of the terminal. The display unit 840 may include a display panel 841. Optionally, Liquid Crystal Display (LCD) or Organic Light-Emitting Diode (OLED) may be used to configure the display panel 841.

It should be noted that the touch control panel 831 may cover the display panel 841 to form a touch display screen. When the touch display screen detects touch operations on it or near it, the touch display screen transmits the touch operation to the processor 850 to determine the type of the touch event. Then, the processor 850 provides corresponding visual output on the touch display screen according to the type of the touch event.

The touch display screen includes an application interface display area and a common control display area. Arrangement of the application interface display area and the common control display area is not limited and the application interface display area and the common control display area may be arranged in an arrangement mode, which may distinguish the two display areas, such as they may be arranged from top to bottom or from left to right. The application interface display area may be used to display the interface of the application. Each interface may include an interface element, such as an icon and/or widget table control of at least one application. The application interface display area may be an empty interface that does not include any content. The common control display area may be used to display controls with high usage, such as application icons, e.g., a setting button, an interface number, a scrollbar and a phone book icon, etc.

The processor 850 may be the control center of the terminal, connect to each part of the whole cell phone via various interfaces and circuits, execute each function and process data of the terminal to monitor the terminal as a whole via running or executing soft programs and/or modules stored in the first storage 821 and calling data stored in the second storage 822. Optionally, the processor 850 may include one or multiple processing units.

In embodiments of the present disclosure, via calling the software program and/or modules stored in the first storage 821 and/or data stored in the second storage 822, the processor 850 is used to obtain anchor transmission bandwidth information configured by the network device for the terminal, where a transmission bandwidth corresponding to the anchor transmission bandwidth information is at least one of transmission bandwidths supported by the terminal; and, transmit the information via transmission resources corresponding to the anchor transmission bandwidth information.

Specifically, the processor 850 is further used to receive the anchor transmission bandwidth information configured by the network device for the terminal via System Information (SI), broadcast information, high layer signaling, group common PDCCH or physical layer signaling.

Specifically, the processor 850 is further used to receive index information, which is configured by the network device for the terminal and transmitted from the network device; and, determine the anchor transmission bandwidth information corresponding to the index information according to a predefined mapping relationship between the anchor transmission bandwidth information and the index information.

Specifically, the anchor transmission bandwidth information includes: Downlink (DL) anchor transmission bandwidth information and/or Uplink (UL) anchor transmission bandwidth information.

Specifically, when the anchor transmission bandwidth information is the DL anchor transmission bandwidth information, the processor is further used to receive DL information transmitted from the network device via DL transmission resources corresponding to the DL anchor transmission bandwidth information.

Specifically, the processor 850 is further used to receive UL scheduling information transmitted from the network device via transmission resources, which are in the transmission resources corresponding to the anchor transmission bandwidth information and are used to transmit the PDCCH.

The UL scheduling information at least indicates first transmission resources scheduled by the network device for the terminal, the first transmission resources include UL transmission resources with an interval of k first transmission time units from transmission resources corresponding to the PDCCH. The first transmission time unit is a transmission time unit corresponding to the UL transmission resources or a transmission time unit corresponding to the anchor transmission bandwidth information, k is a positive integer.

Specifically, when the anchor transmission bandwidth information is the UL anchor transmission bandwidth information, the processor 850 is further used to transmit UL information to the network device via UL transmission resources corresponding to the UL anchor transmission bandwidth information.

Specifically, when the information transmission is feedback information transmission, the processor 850 is further used to transmit Acknowledgement/Non-Acknowledgement (ACK/NACK) information, which indicates a reception situation of DL information, to the network device via the transmission resources corresponding to the anchor transmission bandwidth information.

Specifically, the processor 850 is further used to determine transmission resources with an interval of m second transmission time units from the transmission resources, which are in the transmission resources corresponding to the anchor transmission bandwidth information and used to transmit the Physical Downlink Shared Channel (PDSCH), as second transmission resources, where the second transmission time unit is a transmission time unit corresponding to the PDSCH or a transmission time unit corresponding to the anchor transmission bandwidth information, m is a positive integer; and, transmit the ACK/NACK information, which indicates the reception situation of the DL information, to the network device via the second transmission resources.

Specifically, the anchor transmission bandwidth information includes: at least one of frequency domain location information, bandwidth information, numerology information and antenna port configuration information of the transmission resources.

The terminal in embodiments of the present disclosure obtains the anchor transmission bandwidth information configured by the network device and transmits the information via the transmission resources corresponding to the anchor transmission bandwidth information when the terminal does not receive the dedicated transmission bandwidth information indicated by the network device. This is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

The above embodiments describe the method for transmitting the information at the terminal of the present disclosure. One embodiment makes further description of the method for transmitting the information at the network device in combination with figures hereinafter.

Figure 9:
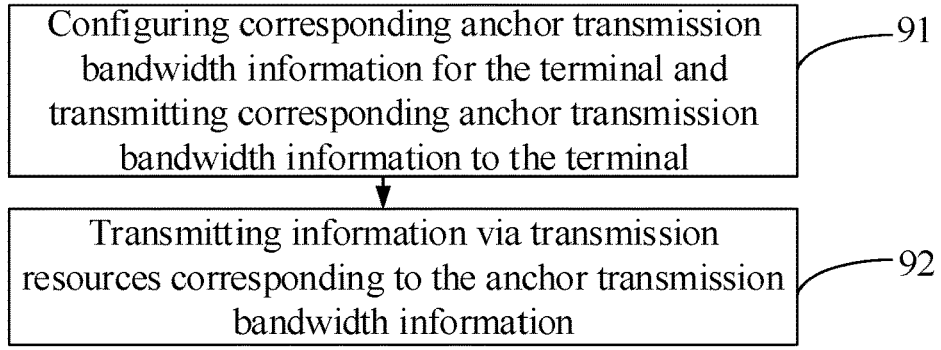
FIG. 9 is a flow chart illustrating a method for transmitting information at a network device according to an embodiment of the present disclosure.

As shown in FIG. 9, the method for transmitting the information in one embodiment of the present disclosure is applied to the network device and specifically has following steps:

At step 91, corresponding anchor transmission bandwidth information is configured for the terminal and transmitted to the terminal.

The NR system has multiple transmission bandwidths and the corresponding terminal supports multiple transmission bandwidths. The transmission bandwidth corresponding to the anchor transmission bandwidth information is at least one of transmission bandwidths supported by the terminal.

At step 92, information is transmitted via transmission resources corresponding to the anchor transmission bandwidth information.

When the network device does not configure dedicated transmission resources for the terminal, the network device may transmit or receive the information via the transmission resources corresponding to the anchor transmission bandwidth information.

Further, the step 91 specifically includes: configuring corresponding anchor transmission bandwidth information for the terminal and transmitting the anchor transmission bandwidth information to the terminal via the SI, broadcast information, high layer signaling, group common PDCCH or physical layer signaling. The anchor transmission bandwidth may be statically, semi-statically, or dynamically configured. Specifically, when the anchor transmission bandwidth is statically configured, the anchor transmission bandwidth may be defined in protocol or may be obtained via System Information (SI), such as NR-Primary Synchronization Signal (PSS), NR-Secondary Synchronization Signal (SSS), or broadcast information. When the anchor transmission bandwidth is semi-statically configured, the anchor transmission bandwidth may be obtained via the high layer signaling (such as Radio Resource Control (RRC) signaling), group common PDCCH, etc. For flexibility, when the anchor transmission bandwidth is dynamically configured, the anchor transmission bandwidth may be obtained via physical layer signaling carried in the Media Access Control (MAC) Control Element (CE). The physical layer signaling may be signaling in Downlink Control Information (DCI) or group common PDCCH.

The anchor transmission bandwidth information includes: at least one of frequency domain location information, bandwidth information, numerology information and antenna port configuration information of the transmission resources. The numerology is also called the parameter configuration. Sub-carrier spacings, frequency domain resource bandwidths or Cyclic Prefix (CP) corresponding to different numerologies may be different. Different numerologies may be reused. The numerology information includes at least one of the frequency domain resource bandwidth, sub-carrier spacing and CP.

The network device may indicate the anchor transmission bandwidth information via an explicit indication mode or via an implicit indication mode. The network device in any scenario may indicate the anchor transmission bandwidth information via the explicit indication mode. However, the implicit indication mode should satisfy certain conditions.

Specifically, the implicit indication mode includes: configuring corresponding anchor transmission bandwidth information for the terminal; when the change period of the anchor transmission bandwidth information supported by the network device is longer than the period of configuring the anchor transmission bandwidth information for the terminal, transmitting the index information corresponding to the anchor transmission bandwidth information to the terminal according to the predefined mapping relationship between the anchor transmission bandwidth information and the index information. Specifically, since the anchor transmission bandwidth information may be fixed, that is, each anchor transmission bandwidth corresponds to a group of fixed frequency domain location information, bandwidth information, numerology and/or antenna port configuration information, the anchor transmission bandwidth information may be defined in protocol and each group of anchor transmission bandwidth information corresponds to a fixed and unique index, in order to reduce the network overhead of the anchor transmission bandwidth information. Further, as for the anchor transmission bandwidth information, which changes semi-statically, when the change period of the anchor transmission bandwidth information supported by the network device is longer than the period of configuring the anchor transmission bandwidth information for the terminal, the network device may notify the terminal of the corresponding relationship between all anchor transmission bandwidth information and indexes. When the anchor transmission bandwidth information of the terminal changes, the network device notifies the terminal of the index corresponding to the new anchor transmission bandwidth information.

The explicit indication mode includes: configuring the corresponding anchor transmission bandwidth information for the terminal; when the change period of the anchor transmission bandwidth information supported by the network device is shorter than or equals the period of configuring the anchor transmission bandwidth information for the terminal, directly transmitting the anchor transmission bandwidth information to the terminal. When the change period of the anchor transmission bandwidth information supported by the network device equals or is shorter than the period of configuring the anchor transmission bandwidth information for the terminal, or called when the anchor transmission bandwidth information dynamically changes, the network device directly transmits the configured anchor transmission bandwidth information to the terminal when the anchor transmission bandwidth information of the terminal changes. Further, the anchor transmission bandwidth information includes: DL anchor transmission bandwidth information and/or UL anchor transmission bandwidth information. Transmission of different scenarios is described according to different types of anchor transmission bandwidth information.

When the anchor transmission bandwidth information is the DL anchor transmission bandwidth information, the step 92 specifically includes: transmitting the DL information to the terminal via the DL transmission resources corresponding to the DL anchor transmission bandwidth information. It is worth pointing out that the applicable scenario is that when the network device does not indicate dedicated DL transmission bandwidth for next transmission, the terminal receives DL information sent from the network device according to DL transmission resources corresponding to the DL anchor transmission bandwidth. There is no need to turn on all supported RF chains, so as to reduce the power consumption of the terminal.

Specifically, the step of transmitting the DL information to the terminal via the DL transmission resources corresponding to the DL anchor transmission bandwidth information includes: transmitting the UL scheduling information of the terminal to the terminal via the transmission resources, which are in the transmission resources corresponding to the anchor transmission bandwidth information and used to transmit the PDCCH. The UL scheduling information is used to indicate first transmission resources scheduled by the network device for the terminal. The first transmission resources include UL transmission resources with an interval of k first transmission time units from transmission resources corresponding to the PDCCH. The first transmission time unit is a transmission time unit corresponding to the UL transmission resources or a transmission time unit corresponding to the anchor transmission bandwidth information, k is a positive integer.

When the anchor transmission bandwidth information is the UL anchor transmission bandwidth information, the step 92 includes: receiving the UL information transmitted from the terminal via the UL transmission resources corresponding to the UL anchor transmission bandwidth information. It is worth pointing out that the applicable scenario is that when the network device does not configure dedicated UL transmission bandwidth for the terminal, the terminal transmits the UL information to the network device via the UL transmission resources corresponding to the obtained UL anchor transmission bandwidth and needs not to turn on all supported RF chains, so as to reduce the power consumption of the terminal.

Further, Acknowledgement/Non-Acknowledgement (ACK/NACK) information is a special scenario of the UL transmission, which is further described in detail hereinafter. That is, the ACK/NACK information, which is used to indicate the reception situation of the DL information and transmitted from the terminal, is received via the transmission resources corresponding to the anchor transmission bandwidth information. It is supposed that the ACK/NACK information is transmitted with the delay of m transmission time units after the data is received, the step of receiving the ACK/NACK information, which is used to indicate the reception situation of the DL information and transmitted from the terminal, using the transmission resources corresponding to the anchor transmission bandwidth information includes: configuring the transmission resources with an interval of m second transmission time units from the transmission resources, which are in the transmission resources corresponding to the anchor transmission bandwidth information and used to transmit the PDSCH, as the second transmission resources and receiving the ACK/NACK information, which is used to indicate the reception situation of the DL information and transmitted from the terminal. The second transmission time unit is a transmission time unit corresponding to the PDSCH or a transmission time unit corresponding to the anchor transmission bandwidth information, m is a positive integer.

The network device may determine the value of m according to various factors, such as the numerology used by the terminal for transmitting the data, the numerology of the anchor transmission bandwidth and processing time of the terminal. Since m is based on the numerologies of different transmission bandwidths and the sub-carrier spacings and transmission time units corresponding to the numerologies of different transmission bandwidths are different, feedback delay m of different terminals may be the same or may be different.

In the method for transmitting the information in embodiments of the present disclosure, the network device configures at least one anchor transmission bandwidth for the terminal, so that the terminal transmits the information via the transmission resources corresponding to the anchor transmission bandwidth information when the terminal does not receive the dedicated transmission bandwidth information indicated by the network device or the obtained dedicated transmission bandwidth information indicated by the network device is the anchor transmission bandwidth information. This is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

The above embodiments describe the method for transmitting the information at the network device in different scenarios. One embodiment makes further description of the corresponding network device in combination with FIGS. 10 and 11 hereinafter.

Figure 10:
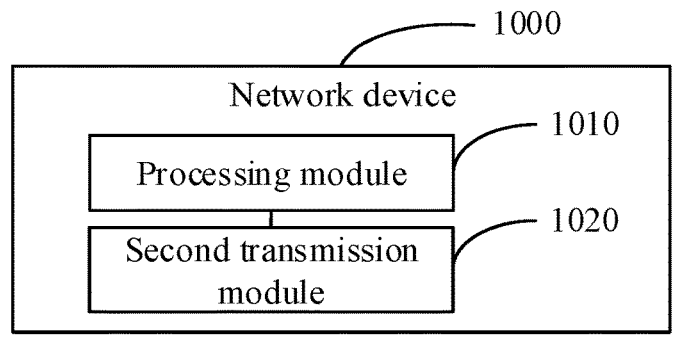
FIG. 10 is a first schematic diagram illustrating modules of a network device according to an embodiment of the present disclosure.

As shown in FIG. 10, the network device 1000 of embodiments of the present disclosure may implement the method details in the fifth embodiment and sixth embodiment, such as configuring and transmitting corresponding anchor transmission bandwidth information to the terminal and transmitting the information via the transmission resources corresponding to the anchor transmission bandwidth information, and may achieve the same effects. The transmission bandwidth corresponding to the anchor transmission bandwidth information is at least one of transmission bandwidths supported by the terminal. The network device 1000 specifically includes following function modules.

A processing module 1010 is configured to configure and transmit corresponding anchor transmission bandwidth information for a terminal, where a transmission bandwidth corresponding to the anchor transmission bandwidth information is at least one of transmission bandwidths supported by the terminal.

A second transmission module 1020 is configured to transmit information via transmission resources corresponding to the anchor transmission bandwidth information.

Figure 11:
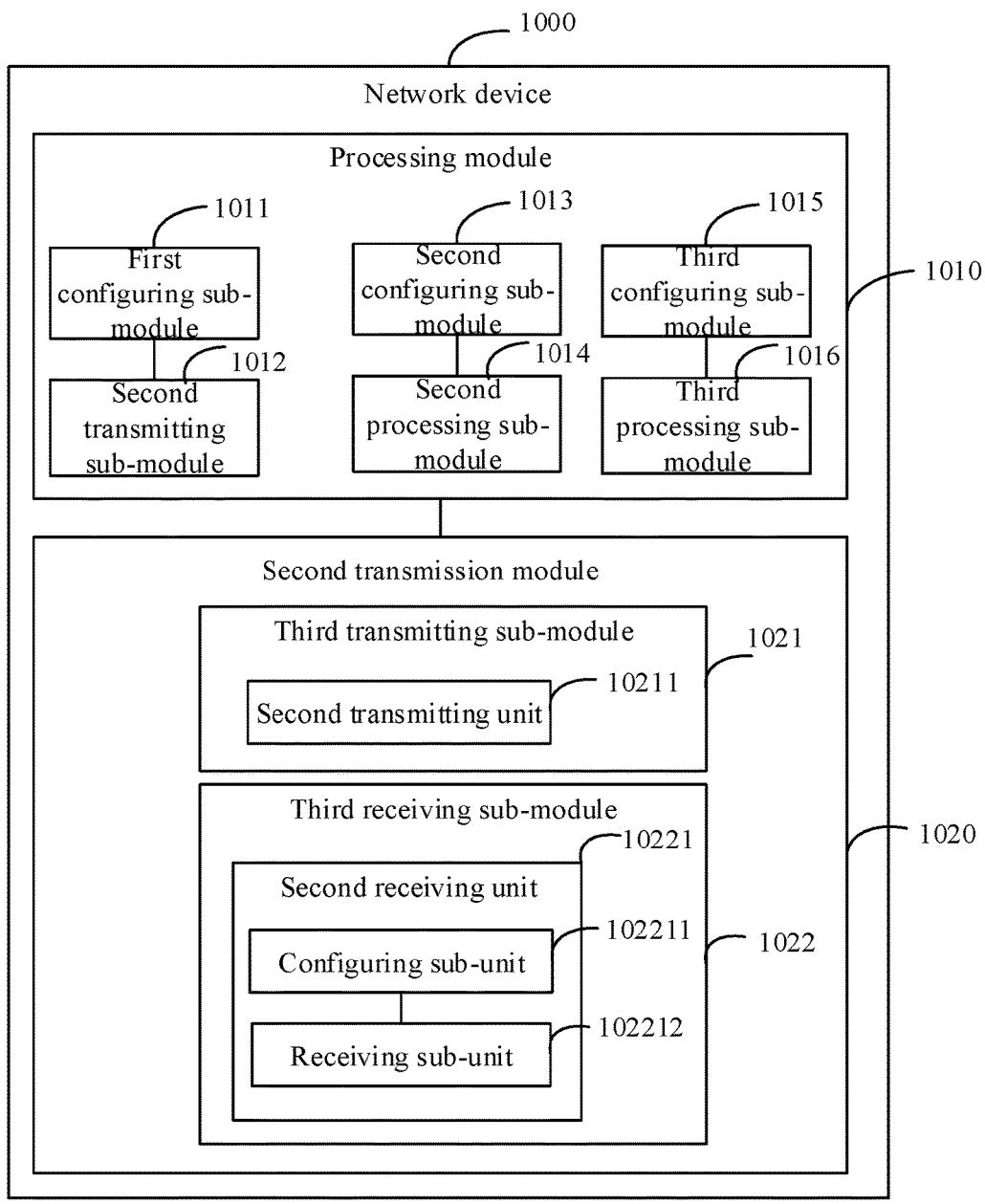
FIG. 11 is a second schematic diagram illustrating modules of a network device according to an embodiment of the present disclosure.

As shown in FIG. 11, the processing module 1010 includes:

a first configuring sub-module 1011, configured to configure the corresponding anchor transmission bandwidth information for the terminal; and a second transmitting sub-module 1012, configured to transmit the anchor transmission bandwidth information to the terminal via System Information (SI), broadcast information, high layer signaling, group common PDCCH or physical layer signaling.

The processing module 1010 further includes:

a second configuring sub-module 1013, configured to configure the corresponding anchor transmission bandwidth information for the terminal; and a second processing sub-module 1014, configured to transmit index information corresponding to the anchor transmission bandwidth information to the terminal according to a predefined mapping relationship between the anchor transmission bandwidth information and the index information when a change period of anchor transmission bandwidth information supported by the network device is longer than a period of configuring the anchor transmission bandwidth information for the terminal.

The processing module 1010 further includes:

a third configuring sub-module 1015, configured to configure the corresponding anchor transmission bandwidth information for the terminal; and a third processing sub-module 1016, configured to directly transmit the anchor transmission bandwidth information to the terminal when a change period of anchor transmission bandwidth information supported by the network device is shorter than or equals a period of configuring the anchor transmission bandwidth information for the terminal.

The anchor transmission bandwidth information includes: Downlink (DL) anchor transmission bandwidth information and/or Uplink (UL) anchor transmission bandwidth information.

The second transmitting module 1020 includes: a third transmitting sub-module 1021, to transmit DL information to the terminal via DL transmission resources corresponding to the DL anchor transmission bandwidth information when the anchor transmission bandwidth information is the DL anchor transmission bandwidth information.

The third transmitting sub-module 1021 includes: a second transmitting unit 10211, to transmit UL scheduling information of the terminal to the terminal via transmitting resources, which are in the transmission resources corresponding to the anchor transmission bandwidth information and used to transmit PDCCH.

The UL scheduling information at least indicates first transmission resources scheduled by the network device for the terminal. The first transmission resources include UL transmission resources with an interval of k first transmission time units from transmission resources corresponding to the PDCCH. The first transmission time unit is a transmission time unit corresponding to the UL transmission resources or a transmission time unit corresponding to the anchor transmission bandwidth information, k is a positive integer.

The second transmission module 1020 further includes: a third receiving sub-module 1022, to receive UL information transmitted from the terminal via UL transmission resources corresponding to the UL anchor transmission bandwidth information when the anchor transmission bandwidth information is the UL anchor transmission bandwidth information.

The third receiving sub-module 1022 includes: a second receiving unit 10221, to receive Acknowledgement/Non-Acknowledgement (ACK/NACK) information, which is transmitted from the terminal and is used to indicate a reception situation of DL information, via the transmission resources corresponding to the anchor transmission bandwidth information when the information transmission is feedback information transmission.

The second receiving unit 10221 includes:

a configuring sub-unit 102211, to configure the transmission resources with an interval of m second transmission time units from the transmission resources, which are in the transmission resources corresponding to the anchor transmission bandwidth information and used to transmit the PDSCH, as the second transmission resources; where the second transmission time unit is a transmission time unit corresponding to the PDSCH or a transmission time unit corresponding to the anchor transmission bandwidth information, m is a positive integer;

a receiving sub-unit 102212 is configured to receive the ACK/NACK information, which is transmitted from the terminal and is used to indicate the reception situation of the DL information, via the second transmission resources.

The anchor transmission bandwidth information includes: at least one of frequency domain location information, bandwidth information, numerology information and antenna port configuration information of the transmission resources.

It is worth pointing out that the network device in embodiments of the present disclosure configures at least one anchor transmission bandwidth for the terminal, so that the terminal transmits the information via the transmission resources corresponding to the anchor transmission bandwidth information when the terminal does not receive the dedicated transmission bandwidth information indicated by the network device, which is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

Figure 12:
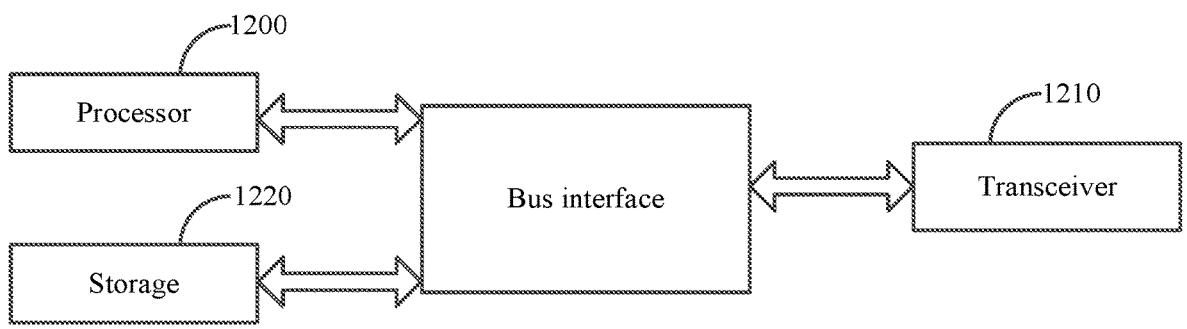
FIG. 12 is a schematic diagram illustrating structure of a network device according to an embodiment of the present disclosure.

As shown in FIG. 12, embodiments of the present disclosure further provide a network device. The network device includes: a processor 1200, a storage 1220 which connects to the processor 1200 via a bus interface, and a transceiver 1210 which connects to the processor 1200 via the bus interface. The storage 1220 is used to store programs and data used by the processor during executing operations. The data information or pilot frequency is transmitted via the transceiver 1210 and the UL control channel is received via the transceiver 1210. When the processor 1200 calls and executes the programs and data stored in the storage 1220, specifically, the processor 1200 is used to read programs in the storage 1220 and specifically execute following functions: configuring corresponding anchor transmission bandwidth information for a terminal. A transmission bandwidth corresponding to the anchor transmission bandwidth information is at least one of transmission bandwidths supported by the terminal.

The transceiver 1210 is used to receive and transmit data under the control of the processor 1200 and specifically execute the following functions: transmitting the corresponding anchor transmission bandwidth information to the terminal and transmitting information via transmission resources corresponding to the anchor transmission bandwidth information.

In FIG. 12, the bus architecture can include any number of interconnected buses and bridges. Specifically, various circuits of one or more processors, which are represented by the processor 1200, and the storage, which is represented by the storage 1220, are linked together. The bus architecture may link various other circuits, such as a peripheral device, voltage regulator and a power management circuit together. These features are well known in this field, therefore, this disclosure does not make further description on these features. The bus interface provides an interface. The transceiver 1210 can be multiple elements, including a transmitter and a receiver and provide units, which communicate with other devices on the transmission medium. The processor 1200 is responsible for managing the bus architecture and common processing and the storage 1220 may store data used by the processor 1200 when executing the operations.

Specifically, the processor 1200 is further used to configure the corresponding anchor transmission bandwidth information for the terminal and control the transceiver 1210 to transmit the anchor transmission bandwidth information to the terminal via System Information (SI), broadcast information, high layer signaling, group common PDCCH or physical layer signaling.

Specifically, the processor 1200 is further used to configure the corresponding anchor transmission bandwidth information for the terminal and control the transceiver 1210 to, when a change period of anchor transmission bandwidth information supported by the network device is longer than a period of configuring the anchor transmission bandwidth information for the terminal, transmit index information corresponding to the anchor transmission bandwidth information to the terminal according to a predefined mapping relationship between the anchor transmission bandwidth information and the index information.

Specifically, the processor 1200 is further used to configure the corresponding anchor transmission bandwidth information for the terminal and control the transceiver 1210 to, when a change period of anchor transmission bandwidth information supported by the network device is shorter than or equals a period of configuring the anchor transmission bandwidth information for the terminal, directly transmit the anchor transmission bandwidth information to the terminal.

The anchor transmission bandwidth information includes: Downlink (DL) anchor transmission bandwidth information and/or Uplink (UL) anchor transmission bandwidth information.

Specifically, the transceiver 1210 is further used to, when the anchor transmission bandwidth information is the DL anchor transmission bandwidth information, transmit DL information to the terminal via DL transmission resources corresponding to the DL anchor transmission bandwidth information.

Specifically, the transceiver 1210 is used to transmit UL scheduling information of the terminal to the terminal via transmitting resources, which are in the transmission resources corresponding to the anchor transmission bandwidth information and used to transmit PDCCH.

The UL scheduling information at least indicates first transmission resources scheduled by the network device for the terminal. The first transmission resources include UL transmission resources with an interval of k first transmission time units from transmission resources corresponding to the PDCCH. The first transmission time unit is a transmission time unit corresponding to the UL transmission resources or a transmission time unit corresponding to the anchor transmission bandwidth information, k is a positive integer.

Specifically, the transceiver 1210 is further used to receive UL information transmitted from the terminal via UL transmission resources corresponding to the UL anchor transmission bandwidth information when the anchor transmission bandwidth information is the UL anchor transmission bandwidth information.

Specifically, the transceiver 1210 is further used to receive Acknowledgement/Non-Acknowledgement (ACK/NACK) information, which is transmitted from the terminal and is used to indicate a reception situation of DL information, via the transmission resources corresponding to the anchor transmission bandwidth information when the information transmission is feedback information transmission.

Specifically, the processor 1200 is further used to configure the transmission resources with an interval of m second transmission time units from the transmission resources, which are in the transmission resources corresponding to the anchor transmission bandwidth information and used to transmit the PDSCH, as the second transmission time unit. The second transmission time unit is a transmission time unit corresponding to the PDSCH or a transmission time unit corresponding to the anchor transmission bandwidth information, m is a positive integer. The processor 1200 is further used to control the transceiver 1210 to receive the ACK/NACK information, which is transmitted from the terminal and is used to indicate the reception situation of the DL information, via the second transmission resources.

The anchor transmission bandwidth information includes: at least one of frequency domain location information, bandwidth information, numerology information and antenna port configuration information of the transmission resources.

Therefore, the network device configures at least one anchor transmission bandwidth for the terminal, so that the terminal transmits the information via the transmission resources corresponding to the anchor transmission bandwidth information when the terminal does not receive the dedicated transmission bandwidth information indicated by the network device, which is applicable to a scenario that multiple transmission bandwidths coexist in the NR system. Further, the terminal only needs to turn on the RF link corresponding to the anchor transmission bandwidth information and needs not to turn on multiple RF links, which may reduce power consumption of the terminal.

Those skilled in the art of the present disclosure may be conscious of that units and algorithm steps in each example described in embodiments of the present disclosure may be implemented via electronic hardware or the combination of the computer software and electronic hardware. Whether these functions are executed by the hardware or software depends on specific application and design constraints of the technical scheme. Professionals apply different methods to each specific application to implement the described functions, but this implementation should not be considered beyond the scope of the present disclosure.

Those skilled in the art can clearly understand that, for the convenience and simplicity of description, the specific working process of the systems, devices and units described above can refer to the corresponding processes in the aforementioned method embodiments, and will not be repeated here.

In the embodiments provided in the present disclosure, it should be noted that the disclosed devices and methods may be implemented via other modes. The device embodiments described above are only schematic. For example, the division of the units is only the division of the logic function. In actual implementation, additional division mode may exist, such as multiple units or components may be combined, integrated into another system, or some characteristics may be omitted or not executed. In addition, mutual coupling, direct coupling or communication connection among each displayed or discussed elements may be implemented via indirect coupling or communication connection between some interfaces, devices or units, such as electrical, mechanical, or otherwise.

The units described above as separation units may or may not be physically separated, and the components displayed as the units may or may not be the physical units. The units can be located in one place or distributed to multiple network units. Some or all of the units may be selected according to actual needs to realize the purpose of the embodiments.

In addition, each functional unit in each embodiment of the present disclosure can be integrated into one processing unit, or each unit can be physically and separately used as a unit, or two or more units can be integrated into one unit.

When the functions are implemented in the form of software functional modules and are sold and used as independent products, the functions can be stored in a computer-readable storage medium. On the basis of such an understanding, the technical scheme in essence or those contributing to the existing technology in embodiments of the present disclosure can be embodied in the form of software products. The computer software product is stored in a storage medium, including several instructions to enable a computer device (which can be a personal computer, server, or network-side device, etc.) to perform all or partial of the method in each embodiment of the present disclosure. The aforesaid storage medium includes various kinds of mediums which may store the program codes, such as, a U disk, a mobile hardware, a Read-Only Memory (ROM), Random Access Memory (RAM), a disk or disc.

In addition, it should be noted that, in the devices and methods in the present disclosure, it is evident that each component or each step can be decomposed and/or reassembled. These decomposition and/or recombination shall be considered equivalent schemes of this disclosure. Also, the steps to perform the processes described above can naturally be performed chronologically in the order described, but not necessarily chronologically. Some steps can be executed in parallel or independently. Those skilled in the art may understand that all or any step or component may be implemented via hardware, firmware, software or their combination in any computing device (including a processor, a storage medium, etc.) or computing devices in the network. This can be implemented by those skilled in the art with their basic programming skills after reading the instructions of the present disclosure.

Thus, the objective of this disclosure may also be implemented by running a program or group of programs on any computing device. The computing device may be a well-known and common device. Thus, the objective of this disclosure may also be implemented only by providing a program product containing program codes that implements the methods or devices. That is, such a program product also constitutes this disclosure, and the storage medium storing the program product also constitutes this disclosure. Obviously, the storage medium may be any well-known storage medium or any storage medium developed in the future. It should also be noted that in the devices and methods in the present disclosure, it is evident that each component or step can be decomposed and/or reassembled. These decomposition and/or recombination shall be considered as equivalent schemes of the present disclosure. Also, the steps to perform the processes described above can naturally be performed chronologically in the order described, but not necessarily chronologically. Some steps can be performed in parallel or independently.

The foregoing only describes preferred embodiments of the present disclosure. To those skilled in the art, several modifications and enhancements can be made without departing from the principle of the present disclosure. These modifications and enhancements should be covered by the protection scope of the present disclosure.

What is claimed is:

1. A method for transmitting information, applied to a terminal, comprising:

obtaining anchor transmission bandwidth information configured by a network device for the terminal, wherein a transmission bandwidth corresponding to the anchor transmission bandwidth information is at least one of transmission bandwidths supported by the terminal; and transmitting information via transmission resources corresponding to the anchor transmission bandwidth information;

wherein obtaining the anchor transmission bandwidth information configured by the network device for the terminal further comprises:

receiving index information, which is configured by the network device for the terminal and transmitted from the network device; and determining the anchor transmission bandwidth information corresponding to the index information according to a predefined mapping relationship between the anchor transmission bandwidth information and the index information;

wherein the transmitting information via transmission resources corresponding to the anchor transmission bandwidth information, comprises:
when not receiving dedicated transmission bandwidth information indicated by the network device or when a received dedicated transmission bandwidth indicated by the network device is the anchor transmission bandwidth, transmitting the information via the transmission resources corresponding to the anchor transmission bandwidth information;
wherein when not receiving dedicated transmission bandwidth information indicated by the network device or when a received dedicated transmission bandwidth indicated by the network device is the anchor transmission bandwidth, transmitting the information via the transmission resources corresponding to the anchor transmission bandwidth information, comprises:
controlling the terminal to turn on only a radio frequency link corresponding to the anchor transmission bandwidth information until the terminal receives the dedicated transmission bandwidth information indicated by the network device.

2. The method according to claim 1, wherein obtaining the anchor transmission bandwidth information configured by the network device for the terminal, comprises:
receiving the anchor transmission bandwidth information configured by the network device for the terminal via System Information (SI), broadcast information, high layer signaling, group common PDCCH or physical layer signaling.

3. The method according to claim 1, wherein the anchor transmission bandwidth information is DL anchor transmission bandwidth information, transmitting the information via the transmission resources corresponding to the anchor transmission bandwidth information, comprises:
receiving DL information transmitted from the network device via DL transmission resources corresponding to the DL anchor transmission bandwidth information.

4. The method according to claim 3, wherein receiving the DL information transmitted from the network device via the DL transmission resources corresponding to the DL anchor transmission bandwidth information, comprises:
receiving UL scheduling information transmitted from the network device via transmission resources, which are in the transmission resources corresponding to the anchor transmission bandwidth information and are used to transmit the PDCCH;
wherein the UL scheduling information at least indicates first transmission resources scheduled by the network device for the terminal, the first transmission resources include UL transmission resources with an interval of k first transmission time units from transmission resources corresponding to the PDCCH, the first transmission time unit is a transmission time unit corresponding to the UL transmission resources or a transmission time unit corresponding to the anchor transmission bandwidth information, k is a positive integer.

5. The method according to claim 1, wherein the anchor transmission bandwidth information is UL anchor transmission bandwidth information, transmitting the information via the transmission resources corresponding to the anchor transmission bandwidth information, comprises:
transmitting UL information to the network device via UL transmission resources corresponding to the UL anchor transmission bandwidth information.

6. The method according to claim 5, wherein when the transmitting information comprises transmitting feedback information, the transmitting information via the transmission resources corresponding to the anchor transmission bandwidth information, comprises:
transmitting Acknowledgement/Non-Acknowledgement (ACK/NACK) information, which indicates a reception situation of DL information, to the network device via the transmission resources corresponding to the anchor transmission bandwidth information.

7. The method according to claim 6, wherein transmitting the ACK/NACK information, which indicates the reception situation of the DL information, to the network device via the transmission resources corresponding to the anchor transmission bandwidth information, comprises:
determining transmission resources with an interval of m second transmission time units from the transmission resources, which are in the transmission resources corresponding to the anchor transmission bandwidth information and used to transmit Physical Downlink Shared Channel (PDSCH), as second transmission resources, wherein the second transmission time unit is a transmission time unit corresponding to the PDSCH or a transmission time unit corresponding to the anchor transmission bandwidth information, m is a positive integer;
transmitting the ACK/NACK information, which indicates the reception situation of the DL information, to the network device via the second transmission resources.

8. The method according to claim 1, wherein the anchor transmission bandwidth information comprises: at least one of frequency domain location information, bandwidth information, numerology information and antenna port configuration information of the transmission resources.

9. The method to claim 1, wherein obtaining the anchor transmission bandwidth information configured by the network device for the terminal, comprises:
receiving the anchor transmission bandwidth information configured by the network device for the terminal via Radio Resource Control (RRC) signaling.

10. A terminal, comprising: a processor, a storage and computer programs which are stored in the storage and run on the processor, wherein the computer programs are executed by the processor to implement steps of:
obtaining anchor transmission bandwidth information configured by a network device for the terminal, wherein a transmission bandwidth corresponding to the anchor transmission bandwidth information is at least one of transmission bandwidths supported by the terminal; and
transmitting information via transmission resources corresponding to the anchor transmission bandwidth information;
wherein obtaining the anchor transmission bandwidth information configured by the network device for the terminal further comprises:
receiving index information, which is configured by the network device for the terminal and transmitted from the network device; and
determining the anchor transmission bandwidth information corresponding to the index information according to a predefined mapping relationship between the anchor transmission bandwidth information and the index information;
wherein the computer programs are executed by the processor to implement steps of:

when not receiving dedicated transmission bandwidth information indicated by the network device or when a received dedicated transmission bandwidth indicated by the network device is the anchor transmission bandwidth, transmitting the information via the transmission resources corresponding to the anchor transmission bandwidth information;

wherein the computer programs are executed by the processor to implement steps of:

controlling the terminal to turn on only a radio frequency link corresponding to the anchor transmission bandwidth information until the terminal receives the dedicated transmission bandwidth information indicated by the network device.

11. The terminal according to claim 10, wherein the computer programs are executed by the processor to implement steps of:

receiving the anchor transmission bandwidth information configured by the network device for the terminal via System Information (SI), broadcast information, high layer signaling, group common PDCCH or physical layer signaling.

12. The terminal according to claim 10, wherein the anchor transmission bandwidth information is DL anchor transmission bandwidth information; the computer programs are executed by the processor to implement steps of:

receiving DL information transmitted from the network device via DL transmission resources corresponding to the DL anchor transmission bandwidth information.

13. The terminal according to claim 12, wherein the computer programs are executed by the processor to implement steps of:

receiving UL scheduling information transmitted from the network device via transmission resources, which are in the transmission resources corresponding to the anchor transmission bandwidth information and are used to transmit the PDCCH;

wherein the UL scheduling information at least indicates first transmission resources scheduled by the network device for the terminal, the first transmission resources include UL transmission resources with an interval of k first transmission time units from transmission resources corresponding to the PDCCH, the first transmission time unit is a transmission time unit corresponding to the UL transmission resources or a transmission time unit corresponding to the anchor transmission bandwidth information, k is a positive integer.

14. The terminal according to claim 10, wherein the anchor transmission bandwidth information is UL anchor transmission bandwidth information, the computer programs are executed by the processor to implement steps of:

transmitting UL information to the network device via UL transmission resources corresponding to the UL anchor transmission bandwidth information.

15. The terminal according to claim 14, wherein when the transmitting information comprises transmitting feedback information, the computer programs are executed by the processor to implement steps of: transmitting Acknowledgement/Non-Acknowledgement (ACK/NACK) information, which indicates a reception situation of DL information, to the network device via the transmission resources corresponding to the anchor transmission bandwidth information.

16. The terminal according to claim 15, wherein the computer programs are executed by the processor to implement steps of:

determining transmission resources with an interval of m second transmission time units from the transmission resources, which are in the transmission resources corresponding to the anchor transmission bandwidth information and used to transmit Physical Downlink Shared Channel (PDSCH), as second transmission resources, wherein the second transmission time unit is a transmission time unit corresponding to the PDSCH or a transmission time unit corresponding to the anchor transmission bandwidth information, m is a positive integer;

transmitting the ACK/NACK information, which indicates the reception situation of the DL information, to the network device via the second transmission resources.

17. The terminal according to claim 10, wherein the anchor transmission bandwidth information comprises: at least one of frequency domain location information, bandwidth information, numerology information and antenna port configuration information of the transmission resources.

* * * * *